UNITED STATES PATENT OFFICE.

WILLIAM W. OGLESBEY, OF BENTON COUNTY, OREGON.

IMPROVED SALVE.

Specification forming part of Letters Patent No. 98,400, dated December 28, 1869.

*To all whom it may concern:*

Be it known that I, WILLIAM W. OGLESBEY, of Benton county, in the State of Oregon, have invented a certain Compound called "Oregon Balm of Gilead Salve," of which the following is a specification:

The nature of my invention consists in mixing venison-tallow, white-fir balsam, balsam of balm of Gilead, bees-wax, extract of dwarf-elder, and sweet olive-oil, dissolving the same by heat in a vessel lined with porcelain until it becomes of the consistency of soft wax when the composition is cool.

To prepare the Oregon Balm of Gilead Salve, I take (to make one pound of the salve) apothecaries' weight, four ounces venison-tallow, one and one-half ounces white-fir balsam, two ounces balsam of balm of Gilead, two ounces of bees-wax, one ounce extract of dwarf-elder, one and one-half ounce of sweet olive-oil and mix together, as aforesaid, stirring the same well while cooling, which, after such mixture, is ready to be used upon sores, cuts, scalds, burns, and wounds of any description, and cutaneous eruptions for the cure of the same.

The method of using the salve is as follows: Spread the salve upon a soft linen cloth (large enough to cover the wound or sore) and apply to the cut, scald, burn, sore, or wound of any kind, and let it remain twelve hours, when remove and wash the affected part with warm water and cast-steel soap; then apply the salve as before until a cure is effected; and it also may be used by gently applying the salve by rubbing to the parts affected.

I claim as my invention—

The manufacture or preparation of a compound which I denominate "Oregon Balm of Gilead Salve," of the ingredients, in the proportions, and for the purposes set forth.

WILLIAM W. OGLESBEY.

Witnesses:
 JAMES HAMAR,
 BUSHROD W. WILSON.